United States Patent [19]

Emery

[11] 4,029,148

[45] June 14, 1977

[54] WELL FRACTURING METHOD

[75] Inventor: Leonard W. Emery, Plano, Tex.

[73] Assignee: Atlantic Richfield Company, Los Angeles, Calif.

[22] Filed: Sept. 13, 1976

[21] Appl. No.: 722,452

[52] U.S. Cl. .............................. 166/254; 166/280
[51] Int. Cl.² ................... E21B 43/26; E21B 47/10
[58] Field of Search .......... 166/250, 253, 254, 259, 166/271, 280, 281, 308; 73/153, 155

[56] References Cited

UNITED STATES PATENTS

| 1,090,673 | 3/1914 | Beecher | 166/254 UX |
| 2,660,887 | 12/1953 | Frei | 166/253 X |
| 2,909,923 | 10/1959 | Miller | 73/155 |
| 3,163,211 | 12/1964 | Henley | 73/155 X |
| 3,173,293 | 3/1965 | Eckels | 166/253 X |
| 3,272,746 | 3/1968 | Sanderson et al. | 73/155 X |
| 3,427,652 | 2/1969 | Seay | 166/308 X |
| 3,709,300 | 1/1973 | Pye | 166/308 X |
| 3,796,883 | 3/1974 | Smith et al. | 166/250 X |
| 3,991,827 | 11/1976 | Schall | 166/253 |

Primary Examiner—Stephen J. Novosad
Assistant Examiner—George A. Suchfield
Attorney, Agent, or Firm—Roderick W. MacDonald

[57] ABSTRACT

In a process wherein a well is fractured using a plurality of solid particles as propping agent, the propping agent particles are color-coded so that if propping particles are subsequently produced out of one or more of the propped fractures, these produced propping particles, when recovered at the earth's surface, can, because of their color-coding, give an indication as to the nature of the problem in the fractured area.

4 Claims, 2 Drawing Figures

WELL FRACTURING METHOD

BACKGROUND OF THE INVENTION

Fracturing one or more areas in a well to increase the productivity thereof, for example to increase the flow of oil and gas into the wellbore for production to the earth's surface, is well known and practiced daily. A conventional procedure in many fracturing processes is to inject a plurality of solid particles such as sand, gravel, and the like, into the fractures so that when the fracturing process is completed the fractures cannot reclose due to overburden pressure and thereby lose the benefit of enhanced fluid recovery due to the formation of the fractures. The propping agent particles flow into the fractures themselves and keep the fractures propped open in a porous manner so that produced fluids can flow through the fractures. The advantage of the fracturing procedure is therefore, retained so long as the propping agent remains in the fracture.

Sometimes, due to numerous and varied conditions, the propping procedure is not successful, or at best partially successful, in that the propping agent is actually forced by the produced fluids back out of the fracture and into the wellbore thereby allowing the fractures to reclose or at least partially reclose, and lose at least part of the benefit of the fracturing process. The produced propping agent is recovered at the earth's surface along with the produced fluids and this indicates that something is wrong with the fracture system that was originally designed for.

In such a situation it would be extremely helpful to be able to identify the particular propping agent which is being recovered at the earth's surface so as to better localize the area or areas where the fracturing process failed.

SUMMARY OF THE INVENTION

According to this invention there is provided a well fracturing method wherein a plurality of solid particles are employed as propping agent, the improvement being that the propping agent particles employed are color-coded so that if propping particles are subsequently produced out of one or more of the propped fractures and recovered at the earth's surface, the propping particles, because of their color-coding, will give an indication as to the nature and location of the problem or failure in the fractured area of the well.

Accordingly, it is an object of this invention to provide a new and improved method for fracturing a well.

It is another object to provide a new and improved method for identifying problem areas in a fractured well due to improper fracturing and/or propping.

Other aspects, objects and advantages of this invention will be apparent to those skilled in the art from this disclosure and the appended claims.

DETAILED DESCRIPTION OF THE INVENTION

Figure 1:
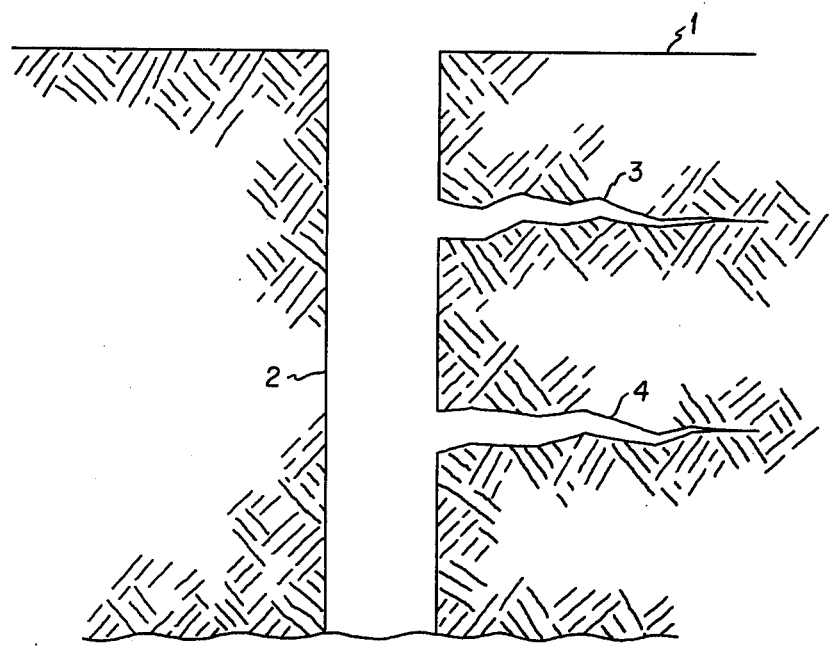
FIG. 1 shows a cross-section of wellbore in the earth and in which two fractures have been created.

More specifically, FIG. 1 shows the earth's surface 1 in which wellbore 2 extends, wellbore 2 having been subjected to a fracturing process and upper and lower fractures 3 and 4 thereby created. These fractures extend out into the earth laterally from wellbore 2.

FIG. 1 represents what is termed a conventional multi-stage fracturing system wherein, for example, fracture 4 was first formed after which fracture 3 was later formed using a separate fracturing treatment. Thus, fractures 4 and 3 were not formed at the same time but rather at different times.

Assume, for example, fracture 4 is formed correctly and propping agent therein stays in fracture 4 and is not produced back out into wellbore 2 by the produced fluids, but fracture 3 is faulty for some reason and propping agent is produced back into wellbore 2. If the same type of propping agent was used in both stages of the fracturing treatment, when propping agent is recovered at the earth's surface it cannot be determined from which fracture (3 or 4) the propping agent came or if it came from both fractures. Thus, it is not known whether to retreat fracture 3 or fracture 4 or both fractures.

In accordance with this invention propping agent of one color is employed in the stage which creates fracture 4 and propping agent of a totally different color is employed in the stage which creates fracture 3. This way should fracture 3 propping agent be produced back to the earth's surface, because of its distinctive color, it is known to a certainty at the earth's surface that only fracture 3 need be retreated thereby eliminating any concern for fracture 4 and saving the time and expense of retreating fracture 4 simply because it is not known whether the propping agent recovered at the earth's surface came from fracture 3 or fracture 4. Similarly, if both colored propping agents are recovered at the earth's surface it is known to a certainty that both fractures 3 and 4 have to be retreated.

Figure 2:
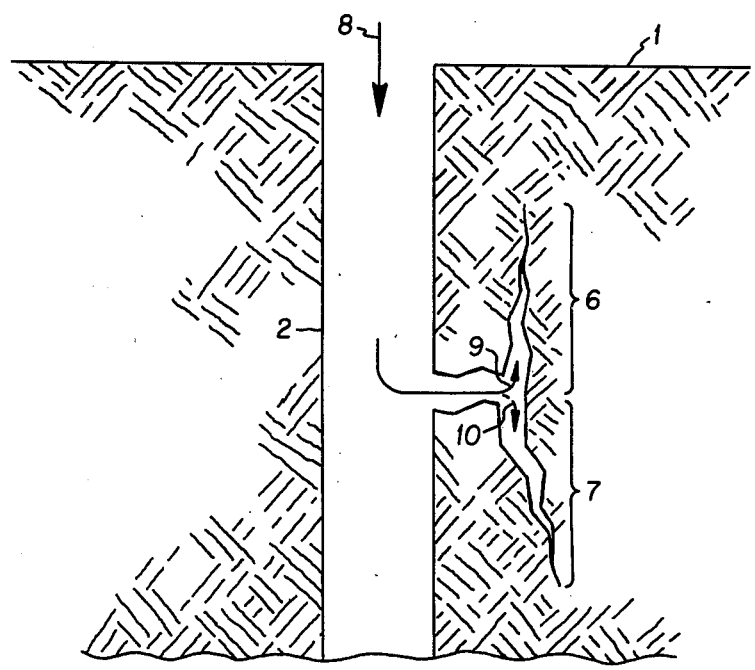
FIG. 2 shows a cross-section of another wellbore in the earth wherein a faulty fracture system has occurred.

FIG. 2 shows the earth's surface 1 with wellbore 2 therein in which a single fracture has been created but the fracture procedure was faulty in that the fracture split into two branches 6 and 7 so that when propping agent is injected from the earth's surface by way of arrow 8 and into the fracture the propping agent splits between the path of arrow 9 into area 6 and the path of arrow 10 into area 7. This is a single stage fracture system which went bad but which cannot be detected as faulty at the earth's surface when the same kind of propping agent is employed for the full fracturing process. However, according to this invention a plurality of slugs of propping agent are employed, each slug being composed of propping agent of a color distinguishable from the other slugs so that recovery of the propping agent at the earth's surface in any sequence other than the reverse sequence from which said propping agent slugs were initially injected into the well (and fracture) indicates a fracture system other than that originally designed for it.

For example, if the propping agent injected into the fracture of FIG. 2 was composed of two slugs, each slug containing propping agent of a different color, and the first slug, because of lower back pressures or any number of other conditions, preferentially flowed upward into area 6 whereas the second, different colored slug, flowed preferentially down into area 7, then it is known at the earth's surface that if a suitable fracture such as fractures 3 or 4 of FIG. 1 was achieved the propping agent first injected would be the last to be produced back into the wellbore. That is to say the propping agent in area 6 should come back out into the wellbore only after the propping agent in area 7 since the propping agent in area 7 was injected last. However, if because of the faulty fracture shown in FIG. 2 propping agent from area 6 should be produced back into wellbore 2 first rather than last, then when this colored propping agent recovered at the earth's surface first it is known to a certainty that the actual fracture system is not that originally designed for.

Of course, the use of a plurality of color-coded slugs of propping agent could be employed in a multi-stage fracturing process such as that described hereinabove with respect to FIG. 1 and is not limited to a single stage fracturing process described with respect to FIG. 2.

Any type of solid particle suitable for propping a well fracture can be employed in this invention, such materials being well known in the art. The propping particles can be colored in any conventional manner such as with dye, paint, and the like or be impregnated with colors or in any other way obvious to those skilled in the art once the concept of this invention is known, the primary requirement being that the different propping agents employed be visually distinguishable from one another when recovered back at the earth's surface. Thus, the composition, size, particle size, grading, amount and the like of the propping particles employed in this invention are dictated by conventional fracturing requirements, all of which are well known in the art. The amount of propping agent employed will depend upon the fracture process designed for. The entire amount of the propping agent need not be colored so long as a sufficient portion up to and including all of the propping agent is colored so as to allow detection at the earth's surface should a small amount thereof be produced back into the wellbore.

EXAMPLE

A well having a cross section essentially the same as that shown in FIG. 1 contains a single thick formation which is desirably fractured to enhance the production of oil and gas from that formation into the wellbore for pumping to the earth's surface. A red particulate propping agent is employed in creating and propping the fracture 4 whereas blue particulate fracturing agent is employed in forming and propping fracture 3. After all fracturing treatments are completed the well is put back on production and the produced fluids visually inspected for a period of time to see if either red or blue or both colored propping agent are recovered at the earth's surface. If none are recovered, it is known that the entire fracturing process was a success. If only red is recovered, it is known that retreating of fracture 4 may be necessary. If only blue is recovered, it is known that the retreatment need only be directed towards fracture 3. If both colors are recovered, it is known that the entire well needs to be retreated.

Reasonable variations and modifications are possible within the scope of this disclosure without departing from the spirit and scope of this invention.

The embodiments of the invention in which an exclusive property or privilege is claimed are defined as follows:

1. In a well fracturing method wherein a plurality of solid particles are employed as propping agent, the improvement comprising the employing color-coded propping agent particles so that if propping particles are subsequently produced out of one or more propped fractures the recovery of such propping particles at the earth's surface gives an indication because of said color-coding as to the nature of the problem in the fractured area.

2. The method of claim 1 wherein said fracturing method involves multi-stage fracturing treatments and different colored propping agent particles are employed in each fracturing stage so that the recovery of any propping agent at the earth's surface indicates which fracturing stage or stages are faulty.

3. The method of claim 2 wherein said single stage fracturing treatment a plurality of slugs of propping agent are employed, each slug being composed of propping agent of a color distinguishable from the other slugs so that recovery of propping agent at the earth's surface in any sequence other than the reverse sequence from which said propping agent slugs were initially injected into the well indicates a fracture system other than that originally designed for.

4. The method of claim 1 wherein said fracturing method involves a single fracturing stage and a plurality of slugs of propping agent are employed, each slug being composed of propping agent of a color distinguishable from the other slugs so that recovery of propping agent at the earth's surface in any sequence other than the reverse sequence from which said propping agent slugs were initially injected into the well indicates a fracture system other than that originally designed for.

* * * * *